Nov. 14, 1939.　　　　　F. J. GOSKEY　　　　　2,179,719
CAP
Filed Nov. 2, 1938
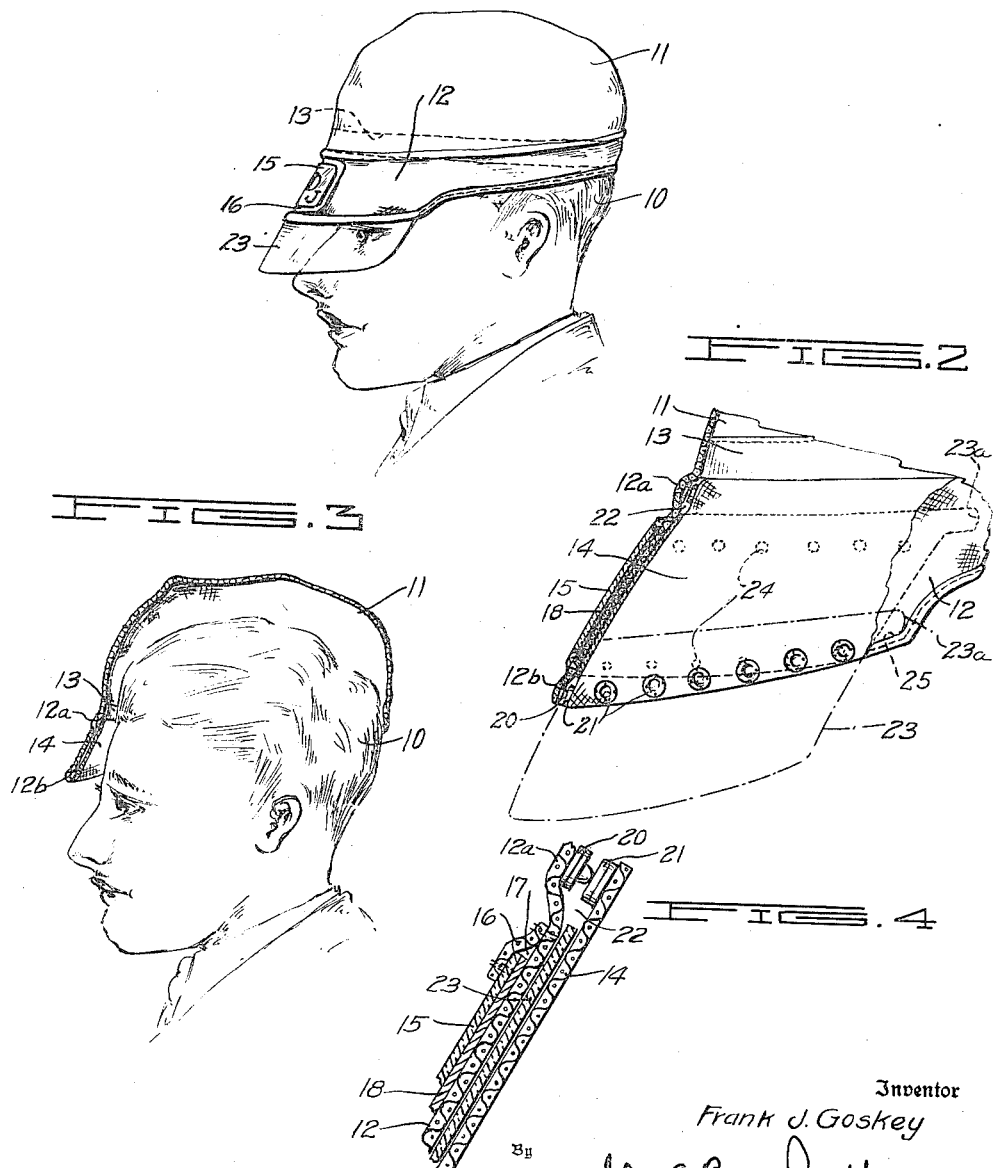
Inventor
Frank J. Goskey
By John A. Bornhardt
Attorney Patented Nov. 14, 1939

2,179,719

UNITED STATES PATENT OFFICE 2,179,719

CAP

Frank J. Goskey, Euclid, Ohio

Application November 2, 1938, Serial No. 238,297

2 Claims. (Cl. 2—11)

My invention relates to caps and in particular to a novel type of a streamlined cap which has incorporated therein a concealed compartment which has for its object a place wherein may be secured a visor that will remain concealed when not in use or may be quickly drawn down when necessary to shield the eyes.

Snap fasteners across the front of the cap at the top and bottom of both the inner and outer rims snap together with the visor therebetween when it is concealed and snap through the aperture in the top of the visor when the visor is lowered.

Small notes and the like may also be kept therein and a further object is the provision for a small compartment wherein a card, or the like, with initials, insignia or similar devices may be shown on the front of the rim, as illustrated, through a transparent material secured upon the rim and forming the small compartment thereby.

These and other objects may be noted from the following specifications and its accompanying illustrations in which:

Fig. 1 is a side elevation of the cap on a man's head with the visor down.

Fig 2 is an enlarged sectional view showing the construction of the cap and visor, both positions of the visor being illustrated.

Fig. 3 is a view similar to Fig. 1, but with the cap in section showing its inside contour.

Fig. 4 is an enlarged fragmentary sectional view showing the compartments and method of securing the inner and outer rims.

Again referring to the illustrations, a man's head 10 is shown, upon which is resting a cap comprising a top 11, and outer rim 12 of a streamlined contour, a head band 13 secured therein and an inner rim 14 secured to the outer rim 12 at its sides and rear by sewing or the like.

The front of the outer rim 12 has secured thereon, by sewing or other suitable means, a piece of transparent material 15 secured to a cloth frame 16 or the like, the said frame portion being secured to the rim 12 in such manner as will cause a compartment 17 to be formed between the transparent material 15 and the rim 12.

The male portions 20 of snap fasteners are secured on the inner side of the front of the rim 12 along both top and bottom beads 12a and 12b respectively, while the female portions 21 are secured to the outer front of the inner rim 14 at both top and bottom as illustrated particularly in Fig. 2, thus forming a concealed compartment 22 between the rims 12 and 14 at the front of the cap wherein is retained a transparent visor 23 having shouldered portions 23a projecting rearwardly from the top edge at each side.

The snap fasteners 20—21 may be separated and the visor 23 drawn down to a position slightly lower than that shown by dot dash lines in Fig 2, the apertures 24 along the top edge of the visor 23 then registering with the said snap fasteners along the bottom of the rims 12 and 14, the shouldered portions 23a of the visor 23 resting within the closures 25 formed between the sewed portions of the inner and outer rims above the lower bead 12b.

Other articles may be carried within this compartment such as drivers' licenses, cards or the like.

It will be obvious that the transparent visor 23 may be tinted to form a glare shield for the eyes as a protection against bright light or sun. The inner and outer rims 12 and 14 form about them a compartment which will hold the transparent visor and other thin articles when not in use. and the fasteners provide means for closing the lower edge of the compartment so that the articles will not fall out, and the appearance is not objectionable or greatly different from an ordinary cap.

The invention is not limited to the exact form shown, but is capable of various modifications within the scope of the following claims.

I claim:

1. A cap having a band extending around the base thereof and forming a rim, said band being provided with an integral extension at the front forming an ordinary visor, an inner layer of material secured to said band behind said projecting portion, and a supplemental transparent visor slidable in and out between said projecting portion of the band and the inner layer, said supplemental visor having shoulders at the ends thereof forming stops to limit the outward movement thereof.

2. A cap as in claim 1, the lower edge of the ordinary visor being provided with fasteners on its inner side, engageable with the supplemental visor.

FRANK J. GOSKEY.